United States Patent [19]
Winn, Jr.

[11] 3,732,673
[45] May 15, 1973

[54] MOTOR DRIVE FOR A LAWN MOWER

[76] Inventor: Lucius A. Winn, Jr., 739 40th Street, Oakland, Calif. 64609

[22] Filed: July 27, 1971

[21] Appl. No.: 166,362

[52] U.S. Cl. ...................56/249, 56/2, 56/11.6, 56/11.8, 56/254
[51] Int. Cl. .............................................A01d 55/20
[58] Field of Search......................56/2, 16.7, 17.5, 56/11.6–11.8, 249–254

[56] References Cited

UNITED STATES PATENTS

| | | |
|---|---|---|
| 2,545,647 | 3/1951 | Buckingham et al..................56/11.6 |
| 2,468,839 | 5/1949 | Rodesci................................56/11.6 |
| 2,623,343 | 12/1952 | Timmins...............................56/11.6 |
| 2,133,512 | 10/1938 | Herge..................................56/11.6 |

FOREIGN PATENTS OR APPLICATIONS

| | | |
|---|---|---|
| 741,321 | 11/1955 | Great Britain........................56/11.6 |

*Primary Examiner*—Louis G. Mancene
*Assistant Examiner*—J. A. Olife
*Attorney*—Joseph B. Gardner

[57] ABSTRACT

A motor is clamped on a fixed shaft extending between the wheels of a lawn mower. A belt is entrained about both a drive or first pulley on the motor shaft and a driven or second pulley on a rotary reel shaft that also extends between the wheels. An idler pulley is mounted on a shaft attached to the outer housing or frame such that the belt may be tightened by adjusting the clamp that secures the motor to the fixed shaft. The second pulley can be drivingly attached to the reel shaft by various means such as radial set screws disposed in a hub of the pulley and/or a protuberance formed on the pulley for cooperative engagement with the cutting reel of the mower to thereby turn the shaft and reel. Two unidirectional clutches (a right and a left) are arranged and oriented such that reel rotation in a forward direction will drive the wheels in a forward direction.

3 Claims, 6 Drawing Figures

PATENTED MAY 15 1973          3,732,673
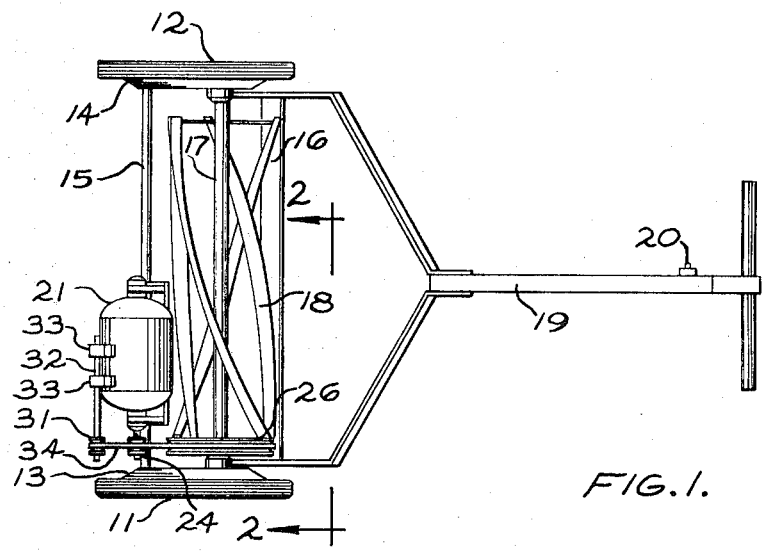
FIG.1.
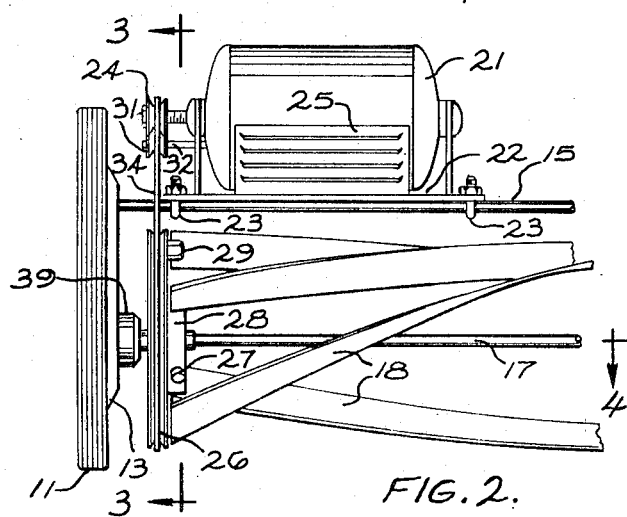
FIG.2.
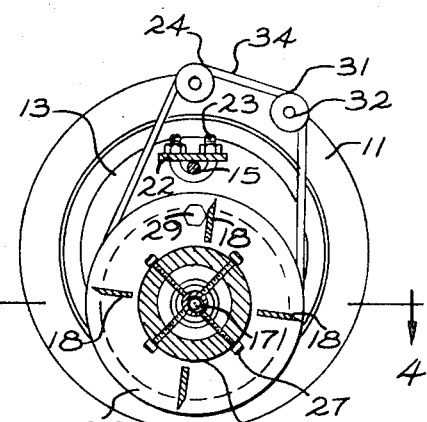
FIG.3.
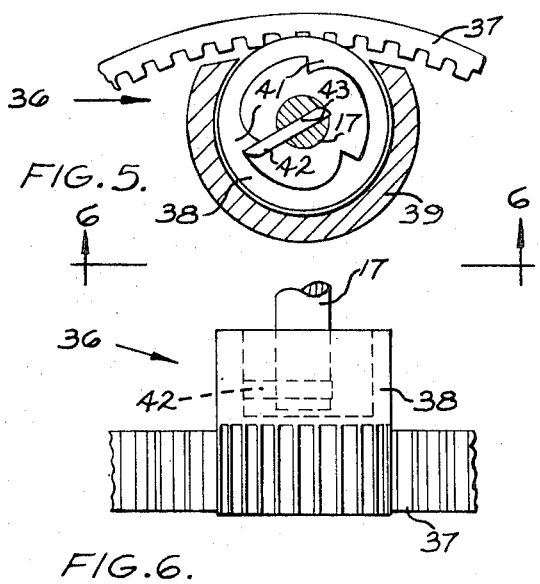
FIG.5.
FIG.6.
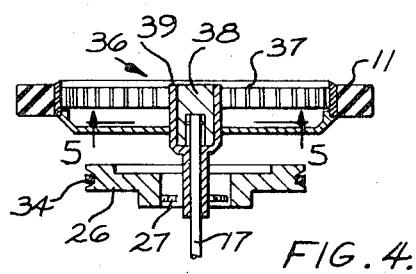
FIG.4.
INVENTOR.
LUCIUS A. WINN, JR.
BY Joseph B. Gardner
ATTORNEY

MOTOR DRIVE FOR A LAWN MOWER

BACKGROUND OF THE INVENTION

This invention relates to lawn mowers and, more particularly, to a means for simply and economically converting a hand or manual driven lawn mower into a motor driven lawn mower.

Hand driven lawn mowers ordinarily include a pair of spaced apart wheels in contact with the ground for driving a cutting reel as the mower is pushed along. The grass cutting reel has spiral blades and is mounted on a reel shaft which extends horizontally between the wheels. As the lawn mower moves, the reel turns or spins across a cutting plate such that grass and other vegetation will be caught between the blades of the reel and the cutting plate and will be sheared as the blades pass across the plate. All of the energy and power for turning the reel and shearing the grass and other vegetation is obtained from the pushing of the lawn mower.

Each of the wheels is mechanically coupled to rotate the reel shaft by unidirectional clutch arrangement which is in a gear housing positioned inside the wheel. The gear housings are spaced apart and provide rigid end structures around which the wheels are rotatably mounted. Each wheel includes a ring gear with teeth which extend inwardly. Each unidirectional clutch includes a pinion gear member engaging the ring gear of the wheel. Each pinion gear member is positioned to rotate about an end of the reel shaft and is provided with ratchet teeth which protrude inwardly toward the reel shaft. Double ended pawl members are mounted to slide transversely through each end of the reel shaft and to engage the teeth of the inner ratchets of the pinion gear members. When the wheels are turned forwardly, the pawls engage the ratchets to rotate the reel shaft and reel forwardly. On the other hand, when the wheels are turned backwardly, the pawls will disengage from the ratchets to permit the wheels to rotate freely. If we consider the action of the unidirectional clutch means or ratchet-pawl arrangements from the standpoint of rotation of the reel shaft driving the wheels, it will be appreciated that when the reel shaft is rotated backwardly, the unidirectional clutch will be engaged such that the wheels will be rotated backwardly. And when the reel shaft is rotated forwardly, the clutches will disengage to permit the reel shaft to rotate freely. Therefore, if a motor drive arrangement were provided to forwardly rotate the reel and reel shaft of an ordinary hand or manual type lawn mower, the operation of the unidirectional clutches would have to be reversed to permit the wheels to be rotated forwardly.

It is an object of this invention to provide an improved motor drive arrangement for a conventional hand operated lawn mower; and more specifically it is an object to provide an inexpensive means for mounting a motor upon a lawn mower, and an inexpensive drive arrangement such that both the grass cutting reel and the wheels are driven in the forward direction by means of the motor.

It is a further object of this invention to provide a method for economically modifying a conventional hand operated lawn mower such that the mower can be powered by a motor, and more particularly, it is an object to provide a simple and inexpensive method for reversing the operation of a unidirectional clutch such that the motor may forwardly rotate the reel shaft which in turn will cause the wheels to rotate forwardly.

SUMMARY OF THE INVENTION

According to this invention, a pulley is mounted on one end of the reel shaft of a lawn mower, and a motor with a drive pulley is mounted on a fixed shaft above the reel. A idler pulley is mounted on a shaft attached to the outer housing of the motor to provide an offset, such that an encircling belt may be properly tensioned by adjusting the motor positioning on the fixed shaft. The wheel assemblies including the ring gear and pinion drives are removed from each end of the reel shaft, such that the ratchet-pinions can be interchanged, left to right and right to left. The wheel drives are reassembled with the ratchets reversed such that the reel shaft, rotated forwardly by the motor will cause the wheels to rotate forwardly by means of reversed unidirectional clutches.

DESCRIPTION OF THE DRAWING

The various features and advantages of this invention will become apparent upon a consideration of the following description taken in connection with the accompanying drawing, which illustrates an exemplary embodiment of the conventional lawn mower which has been modified to provide a motor drive in accordance with the teachings of this invention. The views of the drawing are as follows:

FIG. 1 is a top or plan view of a lawn mower having a motor drive in accordance with this invention;

FIG. 2 is an enlarged fragmentary view looking along the plane 2—2 of FIG. 1;

FIG. 3 is a sectional view looking along the plane 3—3 of FIG. 2;

FIG. 4 is a sectional view looking along the plane 4—4 of FIG. 3 and illustrating the drive elements mechanically coupled between an end of the reel shaft and a wheel;

FIG. 5 is an enlarged fragmentary sectional view looking along the plane 5—5 of FIG. 4 and illustrating the ratchet and pawl elements of a unidirectional clutch; and FIG. 6 is a view looking along the plane 6—6 of FIG. 5.

DESCRIPTION OF THE PREFERRED EMBODIMENT

As shown in FIG. 1, a lawn mower comprises a pair of spaced apart wheels 11 and 12, which are mounted to rotate about rigid end plates or gear housings 13 and 14. A fixed rod or shaft 15 is rigidly attached to and extends between the gear housings 13 and 14. A bottom member or grass cutting plate 16 is also rigidly attached to and extends between the end plates or gear housings 13 and 14. It must be appreciated that the gear housings 13 and 14, the fixed rod 15 and the bottom plate 16 form a rigid structure that supports the other working parts of the lawn mower.

A reel shaft 17 is rotatably mounted in and extends between the gear housings 13 and 14. A grass cutting reel 18 comprises several spiral blades symmetrically positioned around and secured to the reel shaft 17. As the lawn mower moves forwardly, the reel 18 rotates such that grass and other vegetation is caught and sheared off between the blades of the reel 18 and the bottom cutting plate 16. A handle 19 is pivotally attached to the end plates or gear housings 13 and 14. The handle 19 provides means for pushing and propelling the lawn mower forwardly prior to the motor drive modifications of this invention. When modified in accordance with this invention, the handle 19 is used to maneuver and steer the lawn mower. An electric switch 20 may be mounted on the handle 19 for control of the motor 21.

The motor 21 is attached to and supported on a base plate or motor support member 22 which is attached to the fixed shaft 15 of the lawn mower by fastening means such as clamps 23. As shown in FIG. 3, the clamps 23 may be U-bolts which encircle the fixed shaft 15 of the lawn mower, extend through holes in the motor support member 22, and are secured by nuts over threaded ends thereof. The longitudinal and rotary positioning of the motor 21 on the shaft 15 may be adjusted by loosening the clamps 23. A grass shield 25 may be attached to or formed integrally with the motor support member 22. The grass shield 25 extends upwardly adjacent to the motor to protect the motor from flying grass and other deris.

The motor 21 is provided with a first or drive pulley 24 which may be fastened to the drive shaft of the motor 21 by screw threads or other means permitting removal of the pulley. Indeed, the motor may be used for other purposes while mounted on the lawn mower, such as for turning a grinding wheel by removing the pulley and replacing the same with an abrasive wheel. Therefore, the pulley 24 is removable to allow the motor to be used with various attachments. The motor 21 may be easily removable from the lawn mower by loosening the clamps 23 or by detaching the motor from the supporting member 22. Since the motor 21 will be useful in other capacities, the cost of the motor need not be considered, in full, as a required cost of this modification of the lawn mower.

A second pulley or driven pulley 26 is attached to one end of the reel shaft 17 by means such as set screws 27 which extend radially inwardly through a hub 28 of the pulley 26 to engage and lock against the reel shaft 17. Rotation of the pulley 26 will therefore cause rotation of the reel shaft 17 and the reel 18. A further feature for engaging the second pulley 26 with the reel 18 is provided by one or more protuberances 29 which are on the pulley 26 positioned radially outwardly from the reel shaft 17 to abut against one or more blades of the reel 18. As shown in FIGS. 2 and 3, the protuberance 29 may be the head of a bolt or machine screw fastened to a radial web part of the pulley 26. The protuberance 29 may be used to supplement the set screws 27, or it may be used in lieu of the set screws. The protuberance 29 being radially outwardly from the center of rotation of the pulley 26 and of the reel 18, will have a substantial movement arm to better transmit power from the pulley to the reel. However, the set screws 27 having a locking action with the reel shaft 17 would be less prone to vibrate or chatter as the reel 18 is rotated under load with the blades shearing the grass and other vegetation against the bottom plate 16. In an exemplary model of this invention, both means for securing the second pulley to the reel shaft 17 and for transmitting the rotational power to the reel 18 were used, thereby taking advantage of the longer moment arm of the protuberance 29, and the anti-chatter feature of the set screws 27. By any suitable means such as by adjusting the set screws 27, the driven pulley may be fitted for use on different sized shafts 17.

An idler pulley 31 is mounted on a shaft 32 which is held by brackets 33 attached to the outer frame structure of the motor 21 (see FIG. 1). As shown in FIG. 3, the idler pulley 31 is spaced apart from the first pulley 24 on the motor drive shaft. A belt 34 encircles and engages all three pulleys 24, 26, and 31 to provide a method and a means for drivingly coupling the motor 21 to the reel shaft 17 of the lawn mower. To tighten and properly tension the belt 34, the rotational position of the motor 21 on the fixed shaft 15 is adjusted with the clamps 23 loosened as indicated above. Since the idler pulley 31 is spaced apart and offset from the first pulley 24 any rotational adjustment of the motor positioning on the fixed shaft 15 will swing the idler pulley inwardly or outwardly into the belt 34. The shaft 32 may be mounted to slip longitudinally through the brackets 33, such that when the motor 21 is removed from the lawn mower to be used for another purpose the idler pulley 31 may be moved in and closely adjacent to the motor frame or housing to be stored out of way. Therefore, when the motor 21 is mounted on the lawn mower the shaft 32 may be extended to align the idler pulley 31 with the other pulleys 24 and 26; and when the motor is used with a grinding wheel or such the shaft 32 may be retracted such that the pulley 31 will not interfere with the grinding or other operations.

As shown in FIGS. 5 and 6 a unidirectional clutch 36 is mechanically coupled between the reel shaft 17 and a ring gear 37 which is a part of the wheel 11 (see FIG. 4). The ring gear 37 has inwardly extending teeth which engage the teeth of a pinion gear member 38. The pinion gear member 38 is enclosed with a stationary sleeve 39 which rotatably supports and holds the pinion gear member 38 in engagement with the ring gear 37, and concentrically around the end of the reel shaft 17. The stationary sleeve 39 has a segment removed from the top thereof to avoid interference with the teeth of the ring gear 37 (see FIG. 5). The sleeve 39 is rigidly attached to and may be considered to be part of the gear housing member 13 which provides the rigid end structure about which the wheel 11 rotates and to which the fixed shaft 15 and the handle 19 are attached.

The pinion gear member 38 is hollow or cupped out on one end for receiving the end of the reel shaft 17 therein. The inner surface is formed with ratchet teeth 41 protruding inwardly towards the centrally disposed reel shaft 17. A double ended pawl member 42 is mounted to slide back and forth within a hole or opening 43 extending transversely through the end of the reel shaft 17. As shown in FIG. 5, the reel shaft 17 may rotate freely in the counterclockwise direction because the pawl 42 will be cammed back and forth by inclined surfaces of the ratchet teeth 41. The pawl will be pushed alternately by the inclined surfaces on one side, and then by the inclined surfaces on the other side of the ratchet teeth as the shaft 17 rotates counterclockwise. On the other hand, when the shaft 17 rotates clockwise (as shown in FIG. 5), one end of the pawl 42 will protrude and abut against the abrupt side of a ratchet tooth to engage the clutch, and to drive the pinion gear member 38 and the ring gear 37 likewise in the clockwise direction. It will be appreciated that forward rotation of the reel shaft 17 will engage the clutch means 36 to drive the wheels 11 and 12 forwardly; and that the wheels 11 and 12 may be rotated forwardly (by pushing the lawn mower by the handle 19) with the clutch means disengaged such that the wheels will rotate freely.

The unidirectional clutch 36 is ordinarily factory assembled to power the reel shaft rotation from the forward rotation of the wheels. To modify the lawn mower for motor drive in accordance with this invention, it is necessary to reverse the operation of the unidirectional clutch such that forward rotation of the reel shaft 17 will drive the wheels 11 and 12 forwardly. This reversal of the clutch operation may be accomplished with no additional parts by simply removing the pinion gear members from both ends of the reel shaft 17; interchanging the pinion gear members, left to right and right to left; and reassembling the structure with the pinion gear members interchanged. This results in a reversal of the teeth of ratchet surfaces to provide the reversed clutch operations. The pawl members may likewise be turned around such that rounded sides of the pawls will engage the inclined surfaces of the ratchet teeth, and squared sides of the pawls will abut against the abrupt surfaces of the ratchet teeth. It is not necessary to interchange the pawls, but merely to remove the pawls 42 from the shaft openings 43, rotate the pawls axially 180° and return the pawls into the shaft openings.

It will be appreciated that a hand lawn mower may be converted into a motor driven lawn mower with a minimum of parts and expense by following the teachings of this invention. The most expensive item is the motor itself, and this item can be shared with other uses such as powering a grinding wheel. The motor supporting member 22 may be a part of the motor per se. The other required parts would be the U-bolt 23 or other clamp means, the pulleys 24, 26, and 31, the mounting shaft 32 and brackets 33, and the grass shield 25. No additional parts are required for reversing the unidirectional clutch means, since the existing parts are merely interchanged with each other. Therefore, this invention provides a very economical method for converting a hand mower into a motor driven lawn mower. The cost for converting a hand lawn mower into a "power" mower as described above would be very nominal, and the final product would be very much more economical than the cost of purchasing a comparable power mower.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. In combination with a handle-equipped hand mower having spaced apart gear housing members, wheel structures rotatably supported with respect to said gear housing members, a fixed shaft extending between and rigidly attached to said gear housing members, an axially extending reel shaft drivingly connected adjacent the ends thereof with said wheel structures, and a cutting reel mounted upon said reel shaft and equipped with a plurality of angularly separated cutting blades spaced outwardly from said reel shaft and extending generally therealong into adjacency with said gear housing members but terminating spaced distances therefrom: a drive pulley coaxially circumjacent said reel shaft intermediate portions of one gear housing member and the adjacent ends of said cutting blades and having a diameter at least as large as the inner diameter of said cutting blades; at least one protuberance carried by said drive pulley a spaced distance outwardly from said reel shaft in general alignment with one of said cutting blades and engageable therewith for transmitting torque from said drive pulley to said cutting reel; a motor mounted on said fixed shaft and having an output pulley; and an endless belt entrained about said pulleys to transmit power therebetween.

2. The combination of claim 1 and further comprising an idler pulley supported by said motor in generally planar alignment with said output pulley and having said belt entrained thereabout, and clamp means adjustably securing said motor to said fixed shaft in any desired axial and rotational position thereon, whereby said idler pulley is operable to adjust tightness of said belt by rotatably positioning said motor on said fixed shaft.

3. The combination of claim 1 wherein said drive pulley includes a central hub containing a large opening passing said reel shaft therethrough, and a plurality of angularly spaced set screws positioned in said hub and adjustable with respect thereto for securing the same to a member passing through said opening, adjustment of said set screws enabling said drive pulley to be mounted on shaft members of varying diameters.

* * * * *